US008336197B2

(12) United States Patent
Jones

(10) Patent No.: US 8,336,197 B2
(45) Date of Patent: Dec. 25, 2012

(54) COAXIAL CABLE CONNECTOR ATTACHING TOOL HAVING CONNECTING SEATING INDICATOR

(75) Inventor: David Jones, Pawhuska, OK (US)

(73) Assignee: Andrew, LLC, Hickory, NC (US)

(*) Notice: Subject to any disclaimer, the term of this patent is extended or adjusted under 35 U.S.C. 154(b) by 823 days.

(21) Appl. No.: 12/359,899

(22) Filed: Jan. 26, 2009

(65) Prior Publication Data

US 2010/0186224 A1 Jul. 29, 2010

(51) Int. Cl.
*B23P 19/00* (2006.01)
*H01R 43/042* (2006.01)

(52) U.S. Cl. ................ 29/751; 29/747; 29/748; 29/753; 29/758; 29/759

(58) Field of Classification Search .................... 29/751, 29/747–749, 753, 758–760, 816, 863
See application file for complete search history.

(56) References Cited

U.S. PATENT DOCUMENTS 4,160,317 A 7/1979 Sergeant ......................... 29/749
4,765,059 A 8/1988 Pearce ............................ 29/749
4,765,176 A 8/1988 Geisser ........................... 72/410
4,953,384 A 9/1990 Baillet et al. .................... 72/410
6,293,004 B1 * 9/2001 Holliday ......................... 29/751
6,708,396 B2 3/2004 Holliday ......................... 29/751
6,763,583 B1 7/2004 Bryan ............................. 29/863
6,820,326 B1 11/2004 Tarpill et al. .................... 29/751
7,120,997 B2 10/2006 Islam et al. ..................... 29/751
7,188,507 B2 3/2007 Holliday et al. ........... 72/409.14
7,210,327 B1 5/2007 Tarpill et al. ............... 72/409.12
7,596,860 B2 * 10/2009 Sutter et al. ..................... 29/751
2008/0189936 A1 8/2008 Sutter et al. ..................... 29/747

* cited by examiner

*Primary Examiner* — Thiem Phan
(74) *Attorney, Agent, or Firm* — Allen, Dyer, Doppelt, Milbrath & Gilchrist, P.A. Attorneys at Law

(57) ABSTRACT

A tool is for attaching a coaxial cable connector to a coaxial cable by longitudinal compression of the coaxial cable connector. The tool includes a tool body defining therein a connector compression chamber and a plunger receiving chamber longitudinally adjacent thereto. A plunger having a plunger head is within the plunger receiving chamber and a plunger shaft extends outwardly therefrom, the plunger having a bore to receive an end of an inner conductor of the coaxial cable. A handle carried by the tool body is movable from a retracted position to a compressed position for driving the plunger head to longitudinally compress the coaxial cable connector within the connector compression chamber to attach the coaxial cable connector to the coaxial cable. A seating indicator is carried by the bore for contacting the inner conductor of the coaxial cable to indicate seating of the coaxial cable into the coaxial cable connector.

13 Claims, 4 Drawing Sheets

COAXIAL CABLE CONNECTOR ATTACHING TOOL HAVING CONNECTING SEATING INDICATOR

FIELD OF THE INVENTION

The present invention relates to the field of tools for attaching connectors to cables, and, more particularly, to tools for attaching connectors to coaxial cables and related methods.

BACKGROUND OF THE INVENTION

Coaxial cables are widely used to carry high frequency electrical signals. Coaxial cables provide relatively high bandwidth communications with low signal losses, are mechanically robust, and have a relatively low cost. One particularly advantageous use of a coaxial cable is for cable television/Internet, and related communications industries.

The cable television industry, for example, relies upon large and complex infrastructures employing many coaxial cables. Maintenance and expansion of this infrastructure may require significant work to be performed by technicians in the field in less than ideal conditions.

When maintaining or expanding such a cable communications infrastructure that employs many coaxial cables, a service technician may install connectors onto coaxial cables and may couple these connectors to various pieces of equipment to provide service to an end user.

Coaxial cable connectors come in a variety of configurations, and are attached in a correspondingly wide variety of ways with various tools. Some connector configurations, in particular, are secured to a prepared end of a coaxial cable by longitudinally compressing the connector. For example, a conventional connector for a coaxial cable end may comprise a connector housing and a sleeve. The sleeve is forced into the connector housing by longitudinal compression. The connector housing has a threaded coupling with a hex nut at one end to provide secure attachment between the connector and a piece of equipment such as a signal trap.

A tool is typically used to provide the longitudinal compression force upon the connector. One such tool for attaching a coaxial cable connector to a coaxial cable end is disclosed in U.S. Pat. No. 6,708,396 to Holliday. Holliday discloses connector attaching tool having an elongated body and an end stop carried by the body. A plunger is controlled by a lever arm pivotally mounted to the body. The lever advances the plunger toward the end stop to longitudinally compress the connector, properly securing it on the end of the coaxial cable.

Another exemplary tool for attaching a coaxial cable connector to a coaxial cable end is discloses in U.S. Pat. No. 7,120,997 to Islam et al. Islam et al. discloses a connector attaching tool having a lever end and a cable end, with a body slidably supporting a cradle in a cavity formed in the body. A connector housing of a coaxial cable connector is positioned in the cradle. A cradle clamp prevents removal of the connector housing from the cradle but has an opening therein to receive a sleeve of the coaxial cable connector. A handle pivotally connected to the body advances the cradle toward the cable end of the cavity and against a cable clamp through which the coaxial cable may pass but against which the sleeve of the connector abuts, thereby longitudinally compressing the connector to couple it to the cable.

Yet another connector attaching tool for attaching a coaxial cable connector to a coaxial cable is disclosed in U.S. Pat. No. 7,210,327 to Tarpill et al., which discloses a connector attaching tool requiring a reduced actuation force to operate. Increased leverage is obtained through the use of a long swing arm link having one end connected via a first pivot directed to the tool body and the other end connected via a second pivot to a handle. The handle drives a plunger into an end of a coaxial cable connector, thereby compressing it onto a coaxial cable.

Still another tool for attaching a coaxial cable connector to a coaxial cable is disclosed in U.S. Pat. Pub. 2008/0189936 to Sutter et al. Sutter et al. discloses a connector attaching tool for installing coaxial cable connectors on the end of a coaxial cable. This tool may install a variety of different sized connectors onto the end of the coaxial cable. The tool has a base carrying a pair of movable anvils for engaging two different lengths of connectors and a fixed anvil for engaging a third length of connector. The movable anvils define an opening shaped to permit easy entry and exit of a cable while applying a retention force to an inserted cable. A connector seating holder is formed in the front of the tool. A slidably mounted plunger cooperates with the anvils to compress a coaxial cable connector onto the end of the coaxial cable.

Such tools, however, require a technician to manually position a coaxial cable connector in the tool. The positioning of such a coaxial cable connector in the tool may be difficult in less than ideal conditions, such as snow or cold, which may require technician to wear thick gloves. Further, such tools must be manually reloaded between each attachment of a coaxial cable connector to a coaxial cable end. Also, a technician using the above described tools may not be able to easily determine whether the coaxial cable connector has been properly seated on the coaxial cable end. Therefore, despite the above exemplary advances in tools for attaching coaxial cable connectors to the end of coaxial cables, a need for tools that address the above drawbacks remains.

SUMMARY OF THE INVENTION

In view of the foregoing background, it is therefore an object of the present invention to provide a connector attaching tool that facilitates easy coaxial cable connector attachment and indicates to a technician whether the coaxial cable connector has been properly attached to the coaxial cable end.

This and other objects, features, and advantages in accordance with the present invention are provided by a connector attaching tool is for attaching a coaxial cable connector to a coaxial cable end by longitudinal compression of the coaxial cable connector. The connector attaching tool comprises a tool body defining therein a connector compression chamber and a plunger receiving chamber longitudinally adjacent thereto.

A plunger comprising a plunger head is within the plunger receiving chamber and a plunger shaft extends outwardly therefrom. The plunger has a bore extending therethrough to receive an outwardly extending end of an inner conductor of the coaxial cable end. A handle is carried the tool body and is movable from a retracted position to a compressed position for advancing the plunger shaft to drive the plunger head to longitudinally compress the coaxial cable connector within the connector compression chamber to thereby attach the coaxial cable connector to the coaxial cable end. This allows an installer to more easily attach the coaxial cable connector to the coaxial cable end than by hand.

A seating indicator is carried by the bore of the plunger for contacting the outwardly extending end of the inner conductor of the coaxial cable end to thereby indicate seating of the coaxial cable end into the coaxial cable connector. The seating indicator allows a technician to easily see whether the coaxial cable connector has been properly seated on the coaxial cable end.

The seating indicator may comprise an indicator rod movable within the bore of the plunger and a biasing spring for biasing the indicator rod toward the plunger head. Additionally, the indicator rod may have a predetermined length so as to be flush with an end of the plunger shaft when the coaxial cable end is properly seated into the coaxial cable connector. Moreover, the indicator rod may have visually distinguishing indicia thereon. The visually distinguishing indicia allow a technician to more easily see the indicator rod. Alternatively, the seating indicator may comprise a rod movable within the bore of the plunger and a dial indicator cooperating with the rod.

The tool body may have an inlet opening aligned with an end of the connector compression chamber opposite the plunger receiving chamber. At least one capture member may be adjacent the inlet opening and may be selectively operable to capture the coaxial cable connector in the connector compression chamber and to permit removal of the attached coaxial cable connector. The at least one capture member may comprise a pair capture arms pivotally connected to the tool body, each capture arm having a partially circular opening therein.

The tool body may have a plunger inlet opening receiving the plunger shaft. The plunger head may comprise an enlarged diameter portion to retain the plunger head within the plunger receiving chamber.

Another aspect is directed to a method of making a connector attaching tool for attaching a coaxial cable connector to a coaxial cable end by longitudinal compression of the coaxial cable connector. The method may comprise a connector compression chamber and a plunger receiving chamber longitudinally adjacent thereto in a tool body.

A head of a plunger may be positioned within the plunger receiving chamber and the plunger may comprise a plunger shaft extending outwardly therefrom and may have a bore extending therethrough to receive an outwardly extending end of an inner conductor of the coaxial cable end.

A handle may be attached to the tool body so that the handle is movable from a retracted position to a compressed position for advancing the plunger shaft to drive the plunger head to longitudinally compress the coaxial cable connector within the connector compression chamber to thereby attach the coaxial cable connector to the coaxial cable end. A seating indicator may be positioned in the bore of the plunger for contacting the outwardly extending end of the inner conductor of the coaxial cable end to thereby indicate seating of the coaxial cable end into the coaxial cable connector.

DETAILED DESCRIPTION OF THE PREFERRED EMBODIMENTS

Figure 1:
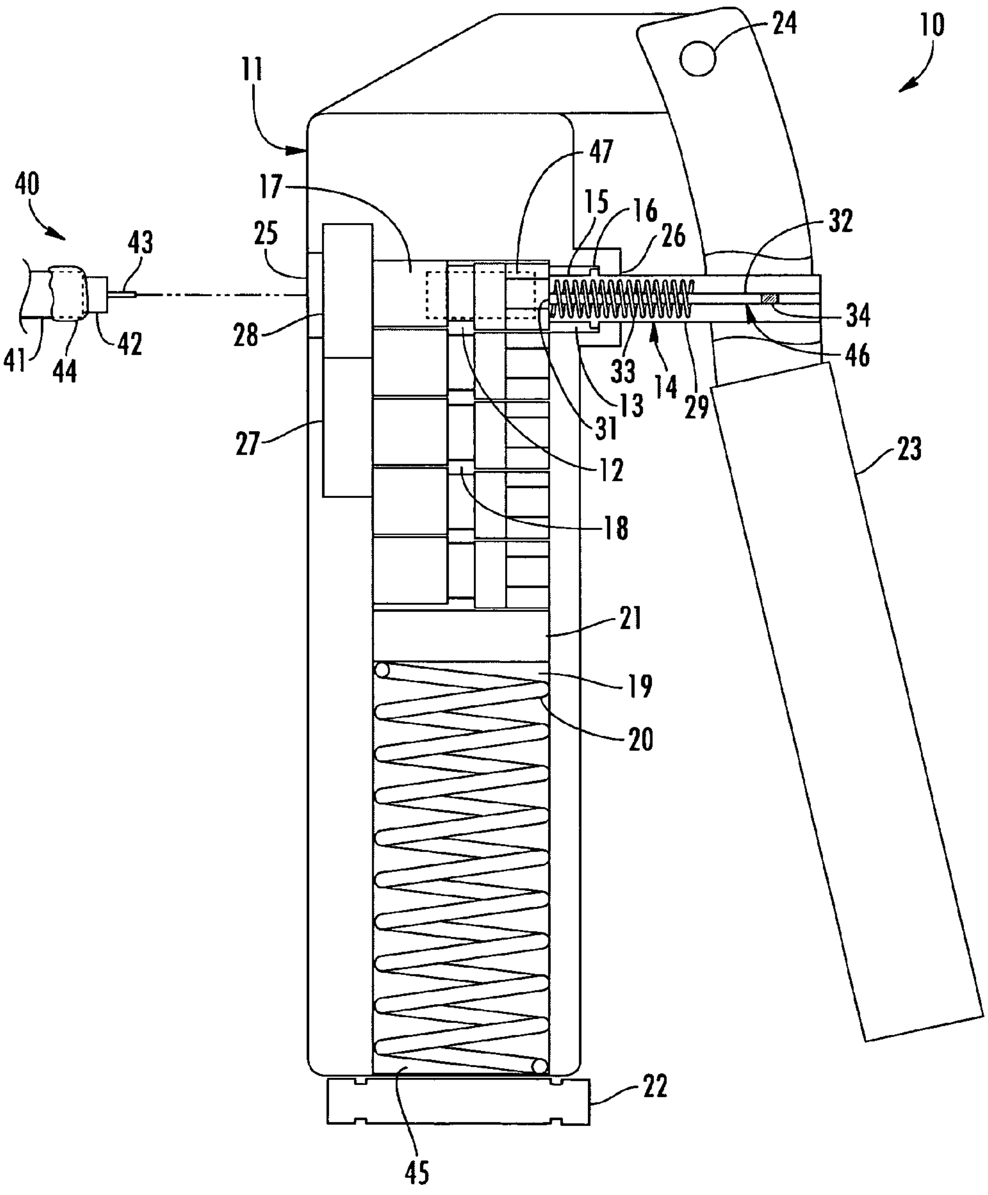
FIG. 1 is a fragmentary view of a connector attaching tool and a coaxial cable to be inserted thereinto, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now to FIGS. 1-5, a connector attaching tool 10 for attaching a coaxial cable connector 17 to a coaxial cable end 40 by longitudinal compression of the coaxial cable connector is now described. The connector attaching tool 10 comprises a tool body 11 illustratively having an elongate shape. The tool body 11 defines a connector compression chamber 12 and a plunger receiving chamber 13 longitudinally adjacent thereto.

A plunger 14 comprising a plunger head 15 is positioned within the plunger receiving chamber 13. A plunger shaft 29 extends outwardly from the plunger head 15. A handle 23 is pivotally connected to an end of the tool body 11 by a hinge pin 24. The handle 23 is movable from a retracted position (shown in FIG. 4) to a compressed position (shown in FIG. 5) for advancing the plunger shaft 29 to drive the plunger head 15 to longitudinally compress the coaxial cable connector 17 within the connector compression chamber 12 to thereby attach the coaxial cable connector to the coaxial cable end 40. A viewing port 47 is illustratively provided in the tool body 11 adjacent the connector compression chamber 12 to allow a technician to see whether there is a coaxial cable connector 17 therein.

Use of this connector attaching tool 10 allows a technician to quickly and securely attach a coaxial cable connector 17 to a coaxial cable end 40. The coaxial cable end 40 comprises an inner conductor 43, an outer conductor 44, and a dielectric layer 42 therebetween. An outer jacket 41 surrounds the outer conductor 44. The coaxial cable end 40 is prepared by stripping away a portion of the outer jacket 41. In addition, part of the outer conductor 44 is peeled away from the dielectric layer 42 and is folded backward over the outer jacket 41, leaving a portion of the dielectric layer 42 exposed. The dielectric layer 42 is trimmed so that the inner conductor 43 extends therebeyond.

The coaxial cable connector 17 is advantageously stabilized and held by the connector compression chamber 12. The handle 23 provides a technician with increased leverage with which to compress the coaxial cable connector 17, helping to ensure full compression and secure connection of the coaxial cable connector to the coaxial cable end 40. The handle 23 illustratively has an elongate shape but of course may have other shapes, as will be appreciated by those skilled in the art.

The tool body 11 has an inlet opening 25 aligned with an end of the connector compression chamber 12 opposite the plunger receiving chamber 13. The inlet opening 25 is sized to receive the coaxial cable end 40 and to allow removal of the coaxial cable end with an attached coaxial cable connector 17. The inlet opening 25 is illustratively circular, but may take other suitable shapes, such as a rectangular shape.

The tool body 11 has a plunger inlet opening 26 that receives the plunger 14. The plunger head 15 has an enlarged diameter portion 16 to retain the plunger head within the plunger receiving chamber 13. That is, the enlarged diameter portion 16 of the plunger head 15 has a diameter greater than a diameter of the plunger inlet opening 26 to retain the plunger head within the plunger receiving chamber.

The plunger 14 has a bore 31 extending therethrough to receive an outwardly extending end of the inner conductor 43 of the coaxial cable end 40. The tool body 11 further defines a connector magazine chamber 18 for storing a plurality of coaxial cable connectors 17. A biasing member 20 is within the connector magazine chamber 18 for urging the coaxial cable connectors 17 toward the connector compression chamber 12. The biasing member 20 is illustratively a spring, although those skilled in the art will recognize that other biasing members may also be used. A base 21 is carried by the biasing member 20 and receives the coaxial cable connectors 17 thereagainst. Of course, this base 21 is optional and the biasing member 20 may instead directly contact the coaxial cable connectors 17.

The biasing member 20 reloads the connector compression chamber 12 with a next coaxial cable connector 17 upon movement of the handle 23 to the retracted position and upon removal of the attached coaxial cable connector and coaxial cable end 40 from the connector compression chamber. When the handle 23 is in the retracted position, the plunger head 15 is in the plunger receiving chamber 13 and not the connector compression chamber 12, to avoid interference between the plunger head and the next coaxial cable connector 17 as it is urged into the connector compression chamber.

Since the connector magazine chamber 18 holds a plurality of coaxial cable connectors 17, a technician does not need to manually reload the connector attaching tool 10 after each attachment of a coaxial cable connector to a coaxial cable end 40. This allows a technician to complete his work more quickly and may therefore provide cost savings by allowing a fewer number of technicians to service a given area. Furthermore, this reduces the difficulties associated with reloading a connector attaching tool 10 in the field under less than ideal conditions (e.g. a technician wearing gloves due to cold weather).

There is a connector feed opening 45 at an end of the connector magazine chamber 19. Coaxial cable connectors 17 may be inserted into the connector magazine chamber 19 through the connector feed opening 45. Furthermore, a closure cap 22 is removably fastened over the connector feed opening 45 to prevent the coaxial cable connectors 17 from exiting through the connector feed opening after reloading of the connector magazine chamber 19 is complete.

Figure 2:
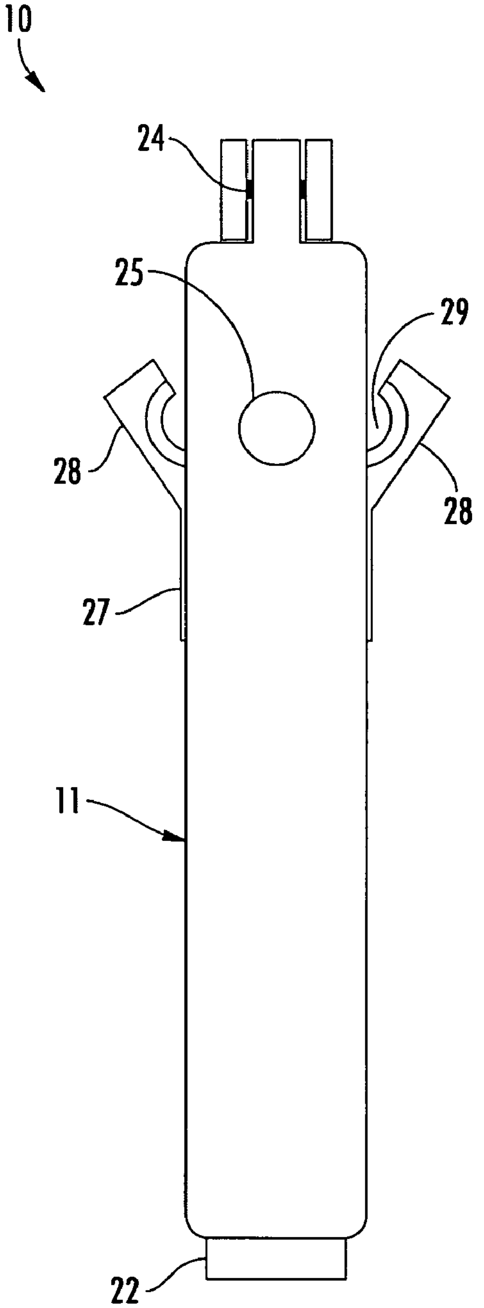
FIG. 2 is a front elevation view of the connector attaching tool of FIG. 1 with the pair of capture arms in a disengaged position to permit removal of an attached coaxial cable connector.
Figure 3:
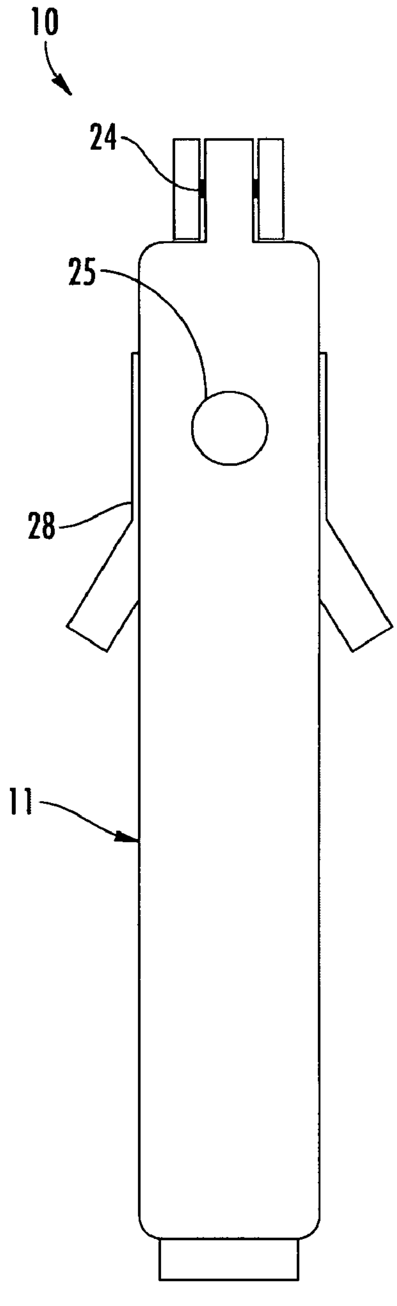
FIG. 3 is a front elevation view of the connector attaching tool of FIG. 1 with the pair of capture arms in an engaged position to capture the coaxial cable connector in the connector compression chamber.

A pair of capture arms 28 is pivotally connected to tool body 11 and is adjacent the inlet opening 25. Each capture arm 28 has a partially circular opening therein and the pair of capture arms are movable from a disengaged position (as shown in FIG. 2) to an engaged position (as shown in FIG. 3) to thereby capture the coaxial cable connector 17 in the connector compression chamber 12. Since the opening formed by the partially circular openings of the pair of capture arms 28 has a diameter less than that of the coaxial cable connector 17, but greater than that of the coaxial cable end 40, the coaxial cable connector is captured when the capture arms 28 are in the engaged position. Likewise, when in the disengaged position, the capture arms 28 permit removal of the attached coaxial cable connector 17 from the connector compression chamber 12.

The capture arms 28 may be moved from the disengaged position to the engaged position by manually squeezing the capture arms together. Similarly, the capture arms 28 may be moved from the engaged position to the disengaged position by pressing the release tabs 27.

Those of skill in the art will recognize that other capture members may be used instead of the pair of capture arms 28. For example, there may be one capture arm 28. Similarly, the capture arms 28 may be moved between the engaged position and the disengaged position by a variety of mechanical structures and need not have the release tabs 27. Furthermore, it should be appreciated that the capture arms 28 are optional and are not required in all applications.

The bore 31 of the plunger 14 carries a seating indicator 46 for contacting the outwardly extending end of the inner conductor 43 of the coaxial cable end 40 to indicate proper seating of the coaxial cable end into the coaxial cable connector 17. Many communication problems involving poor signal quality and poor reception are caused by improperly seated coaxial cable connectors 17. An improperly seated coaxial cable connector 17 may have poor electrical contact with the outer conductor 44 and/or the inner conductor 43. The seating indicator 46 advantageously allows a technician to see whether the coaxial cable end 40 has been properly inserted into the coaxial cable connector 17 so that the inner conductor 43 extends for a desired length inside the coaxial cable connector once the coaxial cable connector has been compressed.

Figure 4:
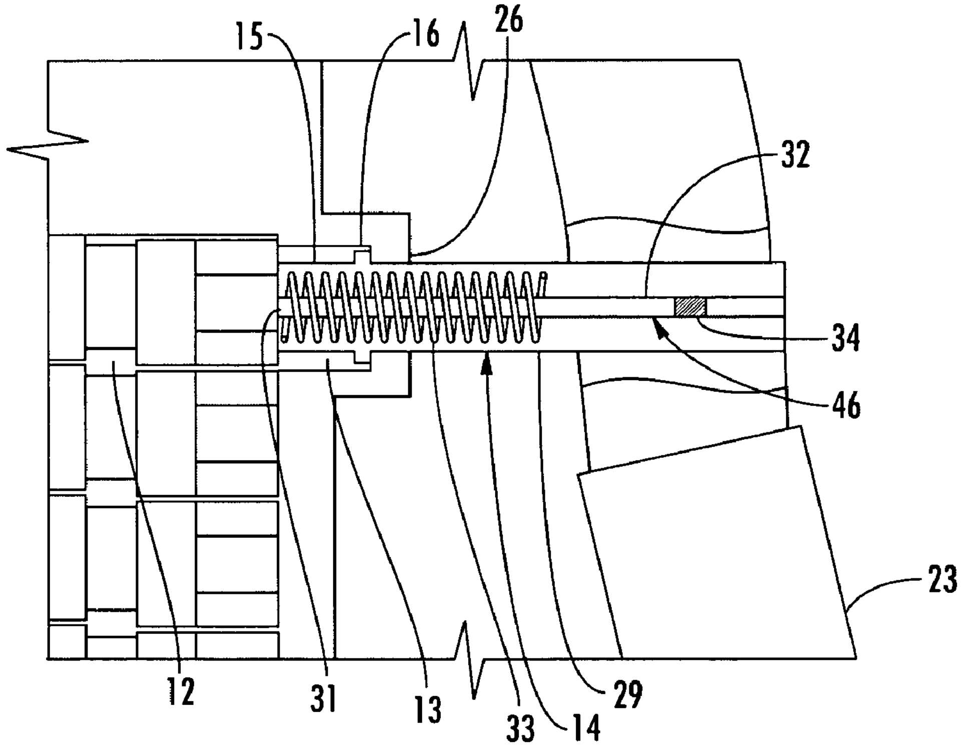
FIG. 4 is an enlarged fragmentary view of a portion of the connector attaching tool of FIG. 1 with the handle in the retracted position.
Figure 5:
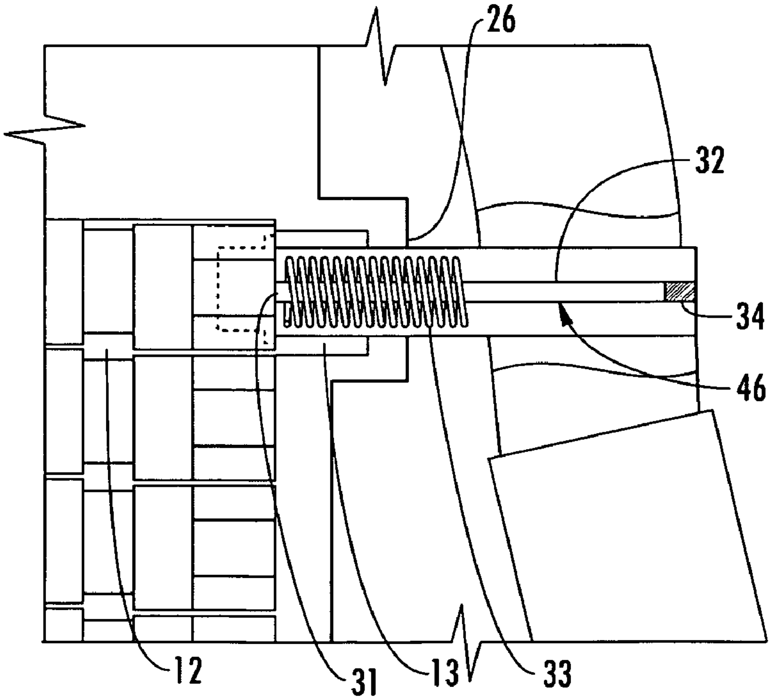
FIG. 5 is an enlarged fragmentary view of a portion of the connector attaching tool of FIG. 1 with the handle in the compressed position.

The seating indicator illustratively comprises an indicator rod 32 movable within the bore 31 of the plunger 14. A biasing spring 33 is coiled around the indicator rod 32 for biasing the indicator rod toward the plunger head 15 (FIG. 4). The indicator rod 32 has a predetermined length so as to be flush with an end of the plunger shaft 29 when the coaxial cable end 40 is properly seated into the coaxial cable connector 17 (FIG. 5). As the coaxial cable connector 17 is compressed, the inner conductor 43 pushes the indicator rod 32 outwardly toward an end of the plunger shaft 29.

The indicator rod 32 has visually distinguishing indicia 34, illustratively a darkened portion, thereon. The visually distinguishing indicia 34 may be an easy to see color, such as red or orange. Of course, the indicator rod 32 need not have such visually distinguishing indicia 34 in other embodiments.

Figure 6:
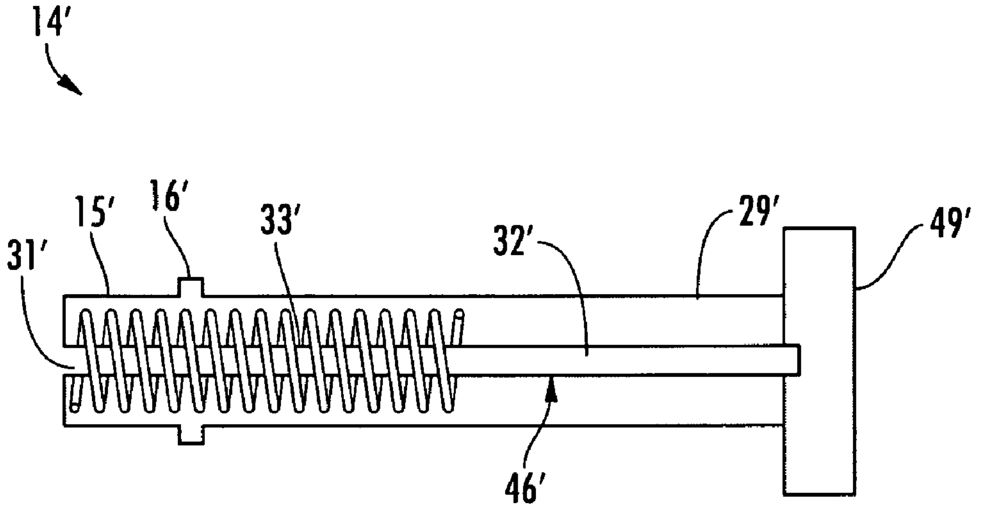
FIG. 6 is a fragmentary view of a seating indicator, such as may be used with the connector attaching tool of FIG. 1.
Figure 7:
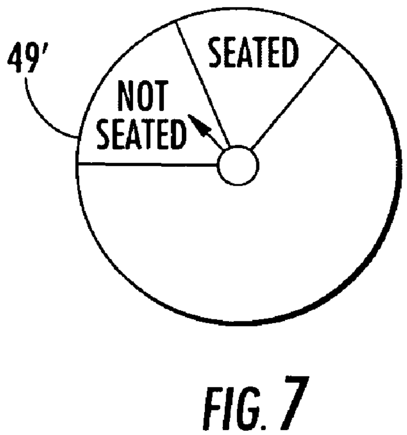
FIG. 7 is a front elevation view of the plunger and seating indicator of FIG. 6.

Referring briefly to FIGS. 6-7, in an alternate embodiment, the seating indicator 46' may comprise a rod 32' movable within the bore 31' of the plunger 14' and a dial indicator 49' cooperating with the rod.

Referring again to FIGS. 1-5, a brief summary of use of the connector attaching tool 10 is now provided. At least one coaxial cable connector 17 is loaded into the connector magazine chamber 18 through the connector feed opening 19. The closure cap 22 is then placed over the connector feed opening 19. The capture members 28 are then compressed into the engaged position to trap the coaxial cable connector 17.

A prepared coaxial cable end 40 is inserted into the inlet opening 25 and the coaxial cable connector 17 aligned therewith. The handle 23 is then moved from the retracted position to the compressed position, advancing the plunger shaft 29 to drive the plunger head 15 to longitudinally compress the coaxial cable connector 17 within the connector compression chamber 12 to thereby attach the coaxial cable connector to the coaxial cable end 40. As the handle 23 is moved to the compressed position, the indicator rod 32 of the seating indicator 46 moves outwardly toward an end of the bore 31 of the plunger 14. When the indicator rod 32 is flush with an end of the bore 31, the coaxial cable connector 14 has been properly seated. The release tabs 27 are then squeezed to move the capture members 28 into the disengaged position. Finally, the coaxial cable end 40 and the attached coaxial cable connector 17 are removed from the connector attaching gun 10.

Other details of such connector attaching tools 10 for attaching coaxial cable connectors 17 may be found in co-pending application, COAXIAL CABLE CONNECTOR ATTACHING TOOL HAVING CONNECTOR MAGAZINE AND ASSOCIATED METHODS, Ser. No. 12/359,881, the entire disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A connector attaching tool for attaching a coaxial cable connector to a coaxial cable end by longitudinal compression of the coaxial cable connector, the connector attaching tool comprising:

a tool body defining therein a connector compression chamber and a plunger receiving chamber longitudinally adjacent thereto;

a plunger comprising a plunger head within the plunger receiving chamber and a plunger shaft extending outwardly therefrom, said plunger having a bore extending therethrough to receive an outwardly extending end of an inner conductor of the coaxial cable end;

a handle carried by said tool body and being movable from a retracted position to a compressed position for advancing said plunger shaft to drive said plunger head to longitudinally compress the coaxial cable connector within the connector compression chamber to thereby attach the coaxial cable connector to the coaxial cable end;

a seating indicator carried by the bore of said plunger for contacting the outwardly extending end of the inner conductor of the coaxial cable end to thereby indicate seating of the coaxial cable end into the coaxial cable connector.

2. The connector attaching tool of claim 1 wherein said seating indicator comprises:

an indicator rod movable within the bore of said plunger; and a biasing spring for biasing said indicator rod toward the plunger head.

3. The connector attaching tool of claim 2 wherein said indicator rod has a predetermined length so as to be flush with an end of said plunger shaft when the coaxial cable end is properly seated into the coaxial cable connector.

4. The connector attaching tool of claim 2 wherein said indicator rod has visually distinguishing indicia thereon.

5. The connector attaching tool of claim 1 wherein said seating indicator comprises:

a rod movable within the bore of said plunger; and a dial indicator cooperating with said rod.

6. The connector attaching tool of claim 1 wherein said tool body has an inlet opening aligned with an end of the connector compression chamber opposite the plunger receiving chamber.

7. The connector attaching tool of claim 6 further comprising at least one capture member adjacent the inlet opening and being selectively operable to capture the coaxial cable connector in the connector compression chamber and to permit removal of the attached coaxial cable connector.

8. The connector attaching tool of claim 7 wherein said at least one capture member comprises a pair capture arms pivotally connected to said tool body, each capture arm having a partially circular opening therein.

9. The connector attaching tool of claim 1 wherein said tool body has a plunger inlet opening receiving said plunger shaft; and wherein said plunger head comprises an enlarged diameter portion to retain said plunger head within the plunger receiving chamber.

10. A connector attaching tool for attaching a coaxial cable connector to a coaxial cable end by longitudinal compression of the coaxial cable connector, the connector attaching tool comprising:

a tool body defining therein a connector compression chamber and a plunger receiving chamber longitudinally adjacent thereto;

a plunger comprising a plunger head within the plunger receiving chamber and a plunger shaft extending outwardly therefrom, said plunger having a bore extending therethrough to receive an outwardly extending end of an inner conductor of the coaxial cable end;

a handle carried said tool body and being movable from a retracted position to a compressed position for advancing said plunger shaft to drive said plunger head to longitudinally compress the coaxial cable connector within the connector compression chamber to thereby attach the coaxial cable connector to the coaxial cable end;

a seating indicator carried by the bore of said plunger for contacting the outwardly extending end of the inner conductor of the coaxial cable end to thereby indicate seating of the coaxial cable end into the coaxial cable connector;

said seating indicator comprising an indicator rod having visually distinguishing indicia thereon and being movable within the bore of said plunger, and a biasing spring for biasing said indicator rod toward the plunger head.

11. The connector attaching tool of claim 10 wherein said indicator rod has a predetermined length so as to be flush with an end of said plunger shaft when the coaxial cable end is properly seated into the coaxial cable connector.

12. The connector attaching tool of claim 10 wherein said at least one capture member comprises a pair capture arms pivotally connected to said tool body, each capture arm having a partially circular opening therein.

13. The connector attaching tool of claim 10 wherein said tool body has a plunger inlet opening receiving said plunger shaft; and wherein said plunger head comprises an enlarged diameter portion to retain said plunger head within the plunger receiving chamber.

* * * * *

UNITED STATES PATENT AND TRADEMARK OFFICE

CERTIFICATE OF CORRECTION

PATENT NO. : 8,336,197 B2
APPLICATION NO. : 12/359899
DATED : December 25, 2012
INVENTOR(S) : David Jones It is certified that error appears in the above-identified patent and that said Letters Patent is hereby corrected as shown below:

Column 8, Line 7 Delete: “pair capture”
Insert: -- pair of capture --

Column 8, Line 52 Delete: “pair capture”
Insert: -- pair of capture --

Signed and Sealed this
Second Day of April, 2013

Teresa Stanek Rea
*Acting Director of the United States Patent and Trademark Office*